Patented Feb. 8, 1944

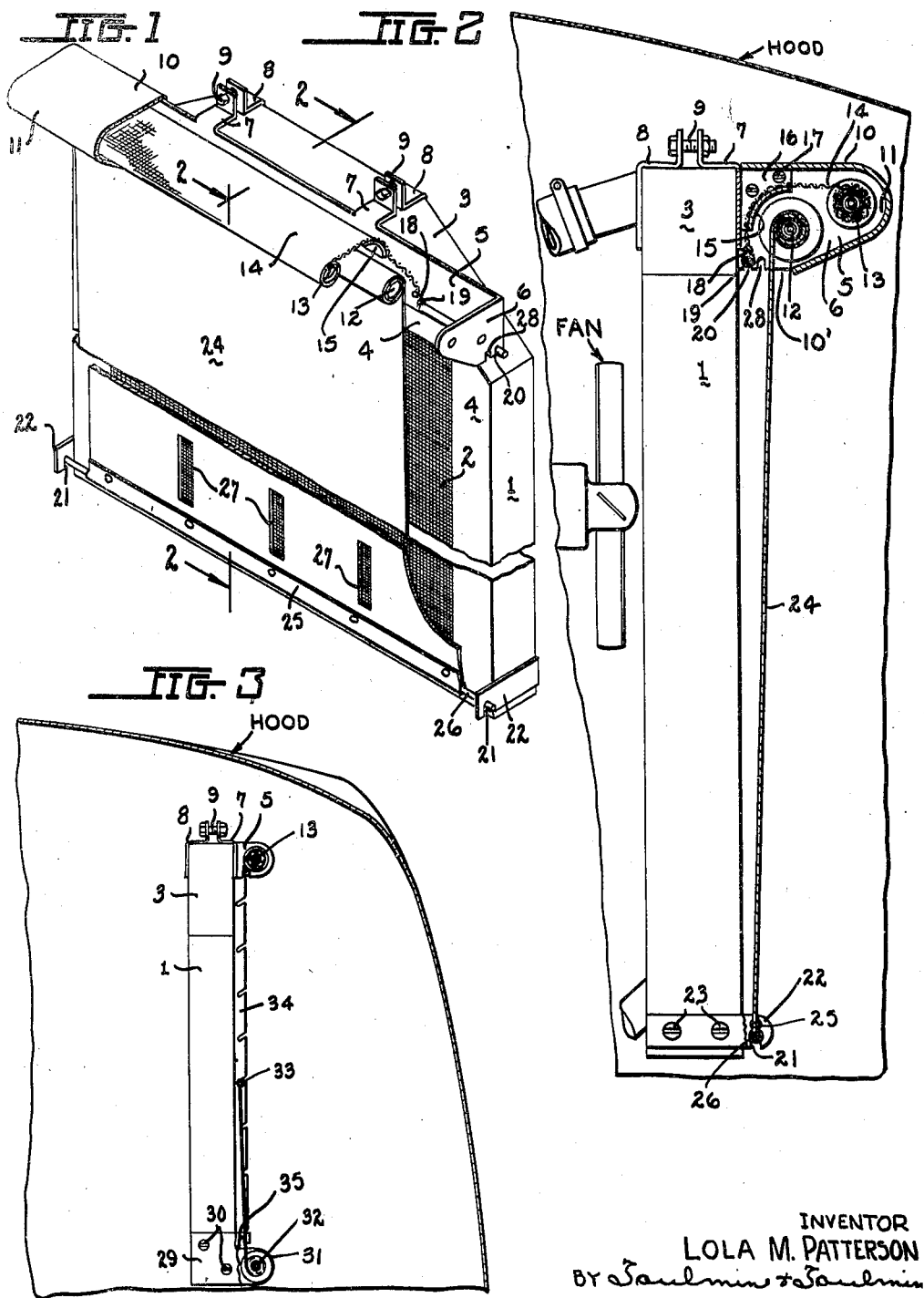

2,340,982

UNITED STATES PATENT OFFICE 2,340,982

CONDITIONING ATTACHMENT FOR AUTOMOBILES

Lola M. Patterson, Lima, Ohio

Application January 22, 1942, Serial No. 427,782

1 Claim. (Cl. 160—25)

The present invention relates to protective devices for radiators of automotive vehicles.

In the automobile art the problem of preventing bugs, insects, etc., from striking the radiator and becoming wedged between the cells has been solved by positioning a permanent screen in front of the radiator. This screen is usually mounted on a rigid rectangular frame of elaborate design, which is screwed or otherwise secured to the solid edge portions of the radiator. In certain types of automobiles this screen constitutes an optional accessory provided by the factory, and forms an integral part of the machine. A bug screen of this character has the disadvantage, apart from its expensiveness, of remaining in position during the seasons of the year when there are no insects, so that the screen is continuously exposed to the weather, and moreover when it is warm the screen may appreciably reduce the circulation of air through the radiator.

For winter driving automobiles are sometimes provided with automatically-closing ventilator shutters having a control which forms part of the engine. In the case of certain modern vehicles, flexible covers of rubberized felt are employed for this purpose which snap into position to leave the proper amount of radiator surface exposed. Still another type of covering consists of heavy cloth, canvas or other fabric carried on a spring-tensioned roll from which the cover is unwound to the proper height along the radiator. However, in all of these cases when a bug screen is additionally employed, the screen remains permanently in position and a winter cover is placed over the screen. Consequently, these weather-conditioning arrangements, considered as a whole, are not only quite unhandy and susceptible to the ravages of the weather, but are also unadapted to be readily moved from one radiator to another.

The primary object of the invention is to provide an improved all-weather conditioning structure for the radiator of an automobile, which structure not only prevents bugs and insects from reaching the radiator in the summer but also conditions the radiator during cold weather.

Another object is to provide a combined radiator screen and blanket accessory which may be readily mounted on any type or size of radiator and is in a compact form, suitable for selling on a retail basis.

A still further object is to provide a combined bug screen and blanket for a radiator, in which the screen or the blanket may be readily and temporarily positioned in front of the radiator, and the screen or blanket which is not in use remains protected from the weather.

The invention will be better understood when the following specification is read in connection with the accompanying drawing.

In the drawing:

Figure 1 represents a fragmentary perspective view of the all-weather conditioning unit, and showing the blanket portion of the unit in operative position.

Figure 2 is an enlarged sectional view of the combined improved screen and blanket accessory, and taken along the line 2—2 in Figure 1.

Figure 3 is an elevational view of a modified form of the improved weather-conditioning unit, the hood of the motor vehicle having been cut away and shown in section in order to see the unit.

Referring more particularly to Figures 1 and 2, reference numeral 1 designates the radiator of a typical type of automotive vehicle, the honeycomb core of the radiator being indicated at 2. As shown in Figure 1, the radiator has been typified as having an angular top portion indicated at 3, with the honeycomb section extending over only a portion of the entire radiator surface, to leave the continuous and unbroken metal areas, designated 4, around the outer edges of the radiator. The present invention concerns a structure which may be employed during the summer months to keep insects from striking the radiator and in the winter to prevent the radiator from freezing, or otherwise to control the temperature of the cooling fluid within the radiator.

In general, the invention contemplates the use of a summer screen and a winter blanket carried by spring-tensioned rolls and contained within a box-like compartment or casing, and sold as a complete unit in an automobile accessory or other retail store. This casing is indicated at 5 and may comprise a U-shaped sheet metal member, having wings or side portions 6 which extend in the longitudinal direction and away from the engine. The back portion of the casing or compartment is provided with a pair of spaced strap members 7 which are angularly shaped, the horizontal portion of which extends toward and rests on top of the radiator. The strap members 7, which may constitute the sole support of the casing 5, may cooperate with angularly shaped strap members 8 which fit over the back of the radiator and together with the strap members 7 constitute clamping units, embracing the upper portion of the radiator and are held in position by the bolts 9. Thus it will be seen that by merely tightening the two bolts 9 the entire casing, including the wing portions 6, is rigidly suspended from the radiator. It will be noted a considerable space is left between the vertically extending portions of the strap members 7, 8, this space being provided for the purpose of adapting the strap clamp to a radiator of any thickness.

The casing 5 is completed by a cover 10 which extends between the wing elements 6 and for a considerable distance around the curved portions 11 of these wing elements, leaving only a relatively small opening 10' directly underneath the casing. Thus the latter is completely inclosed except for this opening. Spanning the wing elements 6 and journalled therein in any suitable manner there is a pair of spring-tensioned rolls 12, 13, the roll 13, as shown in Figure 2, being positioned further to the front of the casing and slightly higher than the roll 12. There is secured to and wound on the roll 13 a wire screen 14 having a length such that when the screen is unwound from the roll the screen will extend over the entire width and height of the radiator. This screen may have a closeness of mesh sufficient to prevent bugs or insects from passing through the openings, but will still leave openings therethrough sufficiently large in the aggregate to provide adequate air circulation for the radiator.

In order to facilitate unwinding the screen from its roll there may be provided any suitable form of guide, indicated at 15. As typified, this guide may take the shape of an arcuate sheet metal piece of a length somewhat greater than the width of the screen and held in position in any suitable manner, for example, by means of vertically extending flanged portions 16 which fit snugly between the wing portions 6 of the casing and to which they may be screwed, as indicated at 17. Thus the arcuate member 15 serves as a frictionless guide for changing the direction of the screen as it leaves the roll 13 to give it a vertical direction, preparatory to drawing the entire length of the screen downwardly over the front side of the radiator. In Figures 1 and 2 the screen is shown in its fully retracted position. The lower end of the screen may be provided with a loop 18, through which a metal rod 19 is threaded, this rod having a length somewhat greater than the length of the casing and being adapted to fit into notches 20 formed in the wing portions 6 of the casing. This is the normal fully retracted position of the screen, and in this position it will be noted that the screen is held taut by the guide 15 and the tightening effect of the spring-tensioned roller 13, so there is not the slightest possibility of rattle.

When the screen 14 is pulled downwardly by grasping the rod 19, similar to the lowering of an ordinary window shade, the rod 19 is received by notches 21 formed at the lower edge of the hook-like straps 22, screwed as indicated at 23 to the lower opposite edges of the radiator 1. When the screen is in its fully drawn-down position and the rod 19 is hooked in the notches 21, the tensioning effects exercised at the roller 13 are maximum so that considerable force is exerted by the roll on the screen, which together with the guiding effects of the element 15 completely eliminates any tendency for the screen to flex inwardly toward the radiator. In order to remove the screen from the radiator it is only necessary to pull the rod 19 out of the notch 21 to permit the roller 13 quickly to withdraw the screen upwardly until the rod 19 can be hooked in the notch 20 at the top of the radiator.

The roller 12 carries a blanket 24 for keeping the engine warm during the winter, and this blanket may comprise any flexible and preferably waterproof heat-absorbing material, such as rubberized felt. The lower end of the blanket is provided with a looped portion 25 through which a rod 26 is threaded, this rod serving to function similarly to the rod 19 of the screen element. When the blanket has been drawn downwardly, as shown in Figure 2, it is assumed that the screen has already been moved upwardly to its fully retracted position so that the notches 21 in the hook members 22 are available to receive the rod 26 of the blanket. As in the case of the screen element described hereinbefore, when the blanket has been fully drawn to its lower position so as to cover the entire front of the radiator, and with the rod 26 hooked in the notches 21, the spring within the roller 12 will be exercising its greatest tensioning force which tends to maintain the blanket in a taut condition, thus preventing actual contact between the blanket and the front of the radiator. If desired, openings 27 of any suitable number and shape may be provided in the blanket 24, at the lower end, in order to assure at least a certain amount of ventilation through the cell portion of the radiator.

From the foregoing it is evident that I have disclosed an all-weather conditioning unit for a radiator which includes a pair of spring-tensioned rolls, one for carrying the screen and the other carrying the blanket. The arrangement is such that the screen may be drawn downwardly in front of the radiator, leaving the blanket in its fully retracted or upward position, so that the screen is in a position to prevent the access of bugs, flies, insects, etc., to the honeycomb cells of the radiator, and during this time the blanket will have been fully rolled up and protected from the elements, due to the completely inclosed casing. Under these conditions the rod 26 will be hooked within the notches 28, where the ends of the rod will be readily accessible to draw the blanket downwardly when the screen is raised for winter driving.

Among many advantages of my improved conditioning structure is the ease with which the front side of the radiator may be provided either with a blanket for winter driving or a bug screen since it is only necessary to uncatch either the rod 26 of the blanket or the rod 19 of the screen from their respective notches at the top, and after pulling the appropriate element down, to merely catch the rod in the notch 21. The changeover from summer to winter driving and vice versa is so simple and inexpensive that any of the gasoline-dispensing stations would readily do the work during a periodic check of the water or other cooling fluid in the radiator. There is absolutely no rattle of any of the parts of the improved structure because both movable elements are held under the maximum taut conditions when being used.

Perhaps the greatest advantage of my improved conditioning unit resides in its universal adaptation to any type of radiator and the facility with which the structure as a whole may be readily packed and sold as an accessory. Except for the hook elements 23, the entire structure may be formed in one unit because the strap members 8 would come temporarily bolted to the strap elements 7, and the screen and blanket rolls 13, 12 would be contained entirely within the casing 5 since the respective rods 19 and 26 would be held by the notches 20 and 28, respectively. Thus the entire unit, including the screen and blanket rolls, could be readily packed into a box of relatively small dimensions and sold by automobile accessory stores or other retail dealers. The structure may be clamped to the radiator without difficulty since it merely requires the tightening of the bolts 9. If desired, the hook members 22 may also take the form of a two-piece detachable clamp, similar to the elements 7, 8, so that no tool other than a monkey wrench is necessary to apply the entire structure to a radiator.

While I have illustrated the fastening means of the structure as being constituted of two or more pairs of straps 7, 8, it is apparent that other well known clamping and securing means may be employed if desired. However, I prefer to employ a clamping arrangement since it lends itself readily to all shapes and sizes of radiators. It is also evident that if desired the position of the blanket roll 12 and screen roll 13 may be different from that illustrated, in that the blanket may be arranged to be positioned closer to the radiator than the screen 14, in which case the positions of the rolls 12, 13 would be interchanged. However, in general, I have found that inasmuch as the blanket roll, when the blanket is in its fully retracted position, is considerably larger than the screen roll under the same conditions, it is preferred that the screen roll shall be placed farther away from the radiator than the blanket roll, as is illustrated. Moreover, the screen roll will, in general, have less weight than the blanket roll so that when it is placed farther away from the radiator than the blanket roll less strain on the supports (due to cantilever effect) will be caused. Another consideration is the fact that when the screen is placed immediately adjacent the front of the radiator the tendency for bugs to find access to the radiator around the edges of the screen is greatly reduced. The amount of space left between the blanket 24 and the radiator 1 at the edges is of little account because the main purpose of the blanket is to prevent cold air coming from the directly forward direction from striking the radiator, and practically none of this air will reach around the edges of the blanket.

In Figure 3 there is illustrated a modification of the invention, in which the screen roll is positioned at the top of the radiator and the blanket roll is positioned at the bottom of the radiator. The screen roll 13 may be similar to that described in connection with Figures 1 and 2 and is contained within a casing 5, clamped or otherwise secured to the top edge of the radiator 1. The lower end of the radiator, at each side thereof, may be provided with a pair of retaining members 29 which may comprise clamping elements similar to the straps 7, 8, or as shown may take the form of plates, screwed as indicated at 30, to the radiator. The plates 29 may form part of a casing 31, similar to the casing 5, completely inclosed except for an opening in the top of the casing. The casing is provided with a suitably journalled roll on which is wound a blanket 32. The top edge of the blanket terminates in a looped portion for receiving the rod 33. There is provided a pair of notched strips 34 along the vertical un-honeycombed portions of the radiator at opposite sides. These notches point slightly upwardly to provide recesses in which the rod 33 may be hooked at different heights. Thus the blanket may be pulled upwardly at the rod 33 to leave exposed any desired portion of the radiator, and as shown in Figure 3 the lower or colder portion of the radiator is covered by the blanket. When the rod 33 is withdrawn from the notches in the strips 34 the blanket 32 will be automatically retracted by the spring-tensioned roll, where it will be protected throughout the summer months by the casing 31. The bug screen 13 is provided with a rod 19, similar to that described hereinbefore, so that during the season when bugs are prevalent the screen may be pulled down against the tension of its roll and hooked in notches 35 provided in the plates 29.

The main difference between the modification shown in Figure 3 and that illustrated in Figures 1 and 2 is that the screen and blanket rolls, in Figure 3, are contained in their individual casings, whereas in Figures 1 and 2 these rolls are combined into a single casing. However, as in the case of the structure shown in Figures 1 and 2, the modification shown in Figure 3 lends itself to ready installation and may be applied to any type and size of radiator, and furthermore may be readily packed in boxes for retail selling purposes. Except for the strips 34, the entire structure consists of only two self-contained units, one of which houses the screen and the other the blanket roll, and the modification shown in Figure 3 has the same advantage by way of permitting the screen to be rolled out of its exposed position when the blanket is being used during the winter.

It will be understood that I desire to comprehend within my invention such modifications as come within the scope of the claim and the invention.

Having thus fully described my invention, what I claim as new and desire to secure by Letters Patent, is:

In a combined screen and blanket device for automobile radiators comprising a casing having wing elements extending in a forward direction and an opening in the bottom thereof, means for supporting in said wing elements at least one roll, strap members extending rearwardly of said casing and adapted for embracing and clamping said casing to the top portion of a radiator, and detachable means adapted for attachment adjacent the bottom of the radiator, said last-named means having a plurality of spaced holding means whereby to retain said roll in extended position.

LOLA M. PATTERSON.